United States Patent [19]
Shimada

[11] Patent Number: 5,285,857
[45] Date of Patent: Feb. 15, 1994

[54] NUT RUNNER FOR CLAMPING BOLTS WITH PREDETERMINED TORQUE AND BOLT CLAMPING METHOD

[75] Inventor: Kyomi Shimada, Toyota, Japan

[73] Assignee: Toyota Jidosha Kabushiki Kaisha, Toyota, Japan

[21] Appl. No.: 953,172

[22] Filed: Sep. 29, 1992

[30] Foreign Application Priority Data

Sep. 30, 1991 [JP] Japan ................. 3-280393

[51] Int. Cl.⁵ ............................................. B23P 19/06
[52] U.S. Cl. ......................................... 173/1; 173/5;
173/181; 173/182; 173/183
[58] Field of Search ............... 173/1, 4, 5, 6, 181, 173/182, 183, 180

[56] References Cited

U.S. PATENT DOCUMENTS

| | | | |
|---|---|---|---|
| 3,586,115 | 6/1971 | Amtsberg et al. | 173/178 |
| 5,062,491 | 11/1991 | Takeshima et al. | 173/1 |
| 5,105,519 | 4/1992 | Doniwa | 173/1 |

FOREIGN PATENT DOCUMENTS 62-166931  7/1987  Japan.
2-110436   9/1990  Japan.

Primary Examiner—Richard K. Seibel
Assistant Examiner—Allan M. Schrock
Attorney, Agent, or Firm—Finnegan, Henderson, Farabow, Garrett and Dunner

[57] ABSTRACT

In order to prevent a looseness of bolts after main clamping, a nut runner of the present invention comprises a torque sensor for detecting a clamping torque T of a clamping unit, and a torque comparison means for comparing the clamping torque T with a clamping completion torque ST. The nut runner further includes a torque control means which gradually reduces a rotational torque of the motor until a resilience such as a torsion accumulated in the clamping unit is entirely nullified when the clamping torque T reaches the clamping completion torque ST. This ensures an effective cancellation of an inverse torque arising from the resilience and acting in the direction loosening the bolt, thus preventing the bolt from loosening.

10 Claims, 4 Drawing Sheets

NUT RUNNER FOR CLAMPING BOLTS WITH PREDETERMINED TORQUE AND BOLT CLAMPING METHOD

BACKGROUND OF THE INVENTION

1. Field of the Invention

The present invention relates to a nut runner and clamping method provided with a means for preventing a bolt or the like from loosening immediately after the clamping thereof.

2. Description of the Related Arts

For the execution of clamping a bolt by the use of a nut runner, the bolt is usually screwed with a threaded hole and subjected to a rotation of the motor until a clamping torque T of the bolt reaches a predetermined seating torque TH as shown by a characteristic curve representing the relationship between the clamping torque T and time t in FIG. 2. Under this preliminary clamping, the motor is once deactivated and then reactivated to clamp the bolt until the clamping torque T reaches the predetermined clamping completion torque ST. When the clamping torque T is above the clamping completion torque, the motor comes to a stop to terminate the clamping operation.

At the time of clamping the bolt, a clamping unit of the nut runner, generally interposed between the bolt and the motor, is liable to undergo an accumulation of resilience such as torsion arising from clamping.

In the conventional manner of clamping the bolt, with the resilience being accumulated in the clamping unit, the motor comes to a stop to free the rotation of a rotor of the motor, and hence the rotor is backed in the direction opposite to the direction clamping the bolt by the resilience. As a result, an inverse torque or a counter torque is generated in the motor as shown by a dotted line in FIG. 2. The inverse torque is exerted in the direction loosening the bolt, which results in a looseness of the which has been once clamped by a predetermined torque.

A nut runner provided with a mechanism for canceling the inverse torque is disclosed in Japanese Utility Model Laid-open Publication No. Hei 2-110436. This nut runner is designed to temporarily stop the motor when the clamping torque reaches the clamping completion torque ST, and then reactivate it immediately after the interruption for a forward rotation for a short period of time in such a manner that the inverse torque can be canceled by the forward torque.

According to the conventional measures described above, however, a predetermined constant forward torque is applied only for a short period of time, and hence it is difficult to effectively cancel inverse torques which are different in magnitude. More specifically, if the inverse torque is larger than the forward torque, a torque corresponding to a difference therebetween is exerted in the direction loosening the bolt. On the contrary, if the forward torque is larger than the inverse torque, the excessive forward torque again brings about an accumulation of the resilience such as torsion in the clamping unit of the nut runner, which disadvantageously leads to a regeneration of the inverse torque at the stopping of the motor.

SUMMARY OF THE INVENTION

The object of the present invention is to reduce gradually the rotational torque of the motor until the clamping unit is entirely free from the torsion after the clamping of the bolt, thereby effectively canceling the inverse torque to prevent the bolt and the like from loosening.

The above-described problems can be solved by the provision of a nut runner having a motor whose rotational torque is controllable, and a clamping unit driven by the motor and for clamping a workpiece, comprising:

a torque detector means for detecting a clamping torque of said clamping unit;

a torque comparison means for comparing said clamping torque with a reference torque value; and a torque control means for gradually reducing the rotational torque of said motor by applying to said clamping unit a post-clamping force corresponding to a torsional force accumulated in said clamping unit for the clamping of the workpiece when it is judged by said torque comparison means that said main clamping torque reaches a clamping completion torque which has been preset.

According to the present invention, the rotational torque of the motor is gradually reduced until the resilience, such as the torsion accumulated in the clamping unit, is entirely nullified after the clamping of the workpiece, such as the bolt, thereby effectively canceling the inverse torque of the motor and preventing the workpiece from being affected by the inverse torque. As a result, the looseness of the workpiece can be prevented.

DESCRIPTION OF THE PREFERRED EMBODIMENTS

A presently preferred exemplary embodiment of the present invention will now be described with reference to the accompanying drawings.

Figure 1:
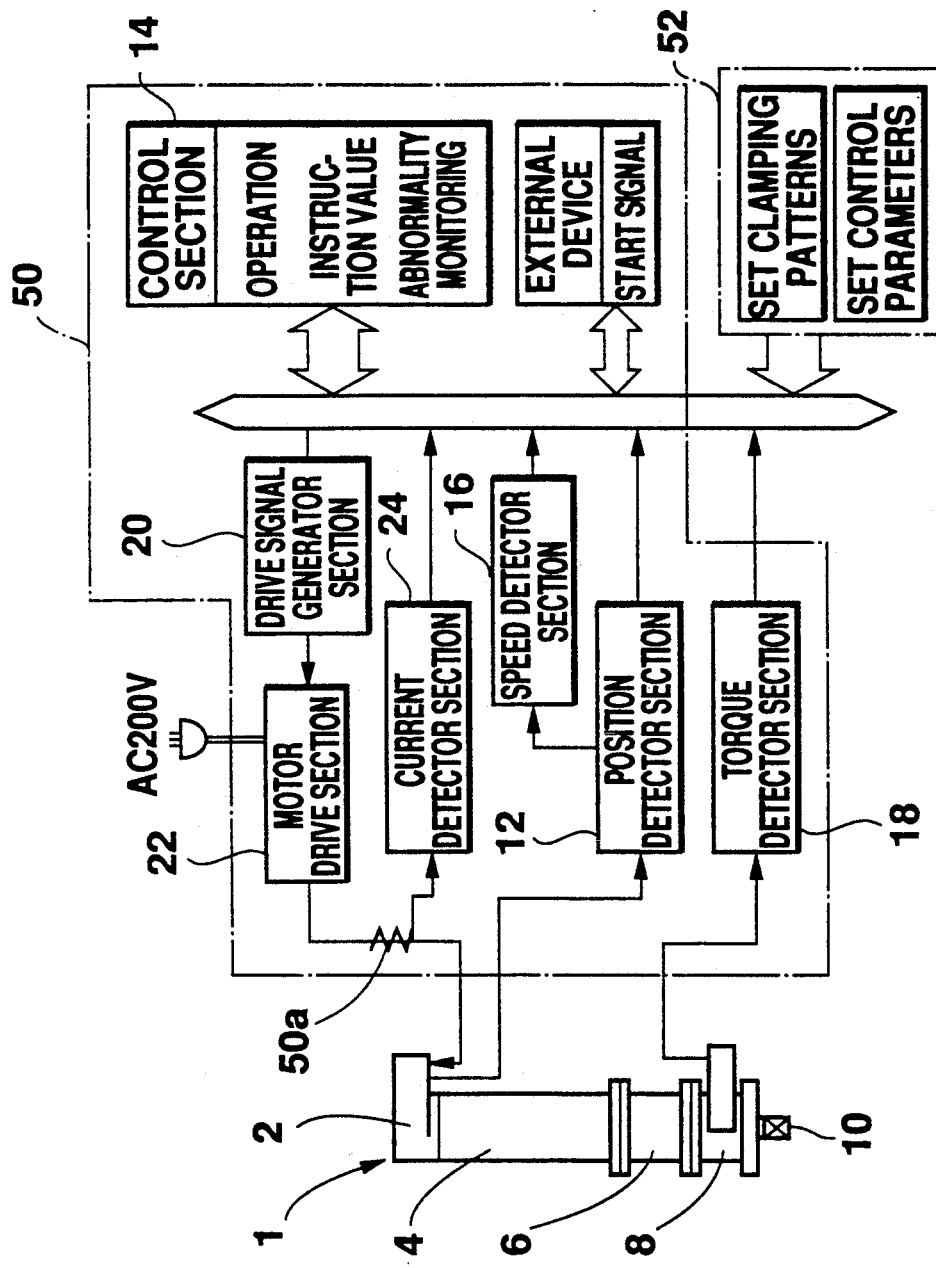
FIG. 1 is a system block diagram of a nut runner and clamping method in accordance with the present invention.

FIG. 1 shows a system block diagram of a nut runner in accordance with a first embodiment of the present invention.

The nut runner comprises a clamping unit generally designated at numeral 1 and acting as an operative portion for clamping workpieces such as bolts not shown. The clamping unit 1 includes therein a motor 4 capable of producing a torque in proportion to a current value to be supplied, the motor 4 having a rotational shaft whose rotational angle is detected by a pulse generator 2. The rotational shaft of the motor 4 is in turn coupled to a reduction gear head 6 which functions to amplify the torque initiated being the motor 4. The reduction gear head 6 has a rotational shaft whose one end is provided with a clamping portion 10 adapted to be engaged with the head of the bolt or the like. The rotational shaft of the reduction gear head 6 is further provided with a distortion gauge type torque sensor 8 which detects a distortion caused on the rotational shaft due to a load applied to the clamping portion 10 and determines a clamping torque T based on the distortion.

A pulse signal output from the pulse generator 2 of the clamping unit 1 is transferred to a position detector section 12 of a control unit 50 which converts it into a rotational angle signal (digital signal) of the rotational shaft of the motor 4 for the input to a control section 14. The rotational angle signal in turn enters a speed detector section 16 which differentiate it to convert it into a rotational speed signal for input to the control section 14 as well.

A distortion signal provided by the distortion gauge type torque sensor 8 of the clamping unit 1 is transferred to a torque detector section 18 of the control unit 50 for the conversion into a clamping torque signal (digital signal) and then input to the control section 14. That is, the distortion gauge type torque sensor 8 and the torque detector section 18 serve in cooperation as a torque detecting means.

A torque instruction signal (digital signal) for the motor 4 output from the control section 14 of the control unit 50 is converted at a drive signal generator section 20 into a pulse signal containing torque instruction information and then amplified for input to a motor drive section 22. The motor drive section 22 acts to control a drive current value supplied to the motor 4 on the basis of the signal transmitted from the drive signal generator section 20, thereby causing the motor 4 to generate a rotational torque proportional to a current value supplied from the motor drive section 22. It is to be noted that the current value to be supplied to the motor 4 is detected by a Hall device current sensor 50a, and is converted at a current detector section 24 into a digital signal of a predetermined level for feedback to the control section 14.

An external device of the control unit 50 produces a clamping start signal and monitors the condition of the control unit 50.

Furthermore, a programmer 52 not only programs clamping procedure patterns or contents of clamping quality to be checked but also sets parameters for controlling the control unit 50.

Functions of the nut runner according to the present invention will next be described with reference to FIGS. 2 to 4.

Figure 4:
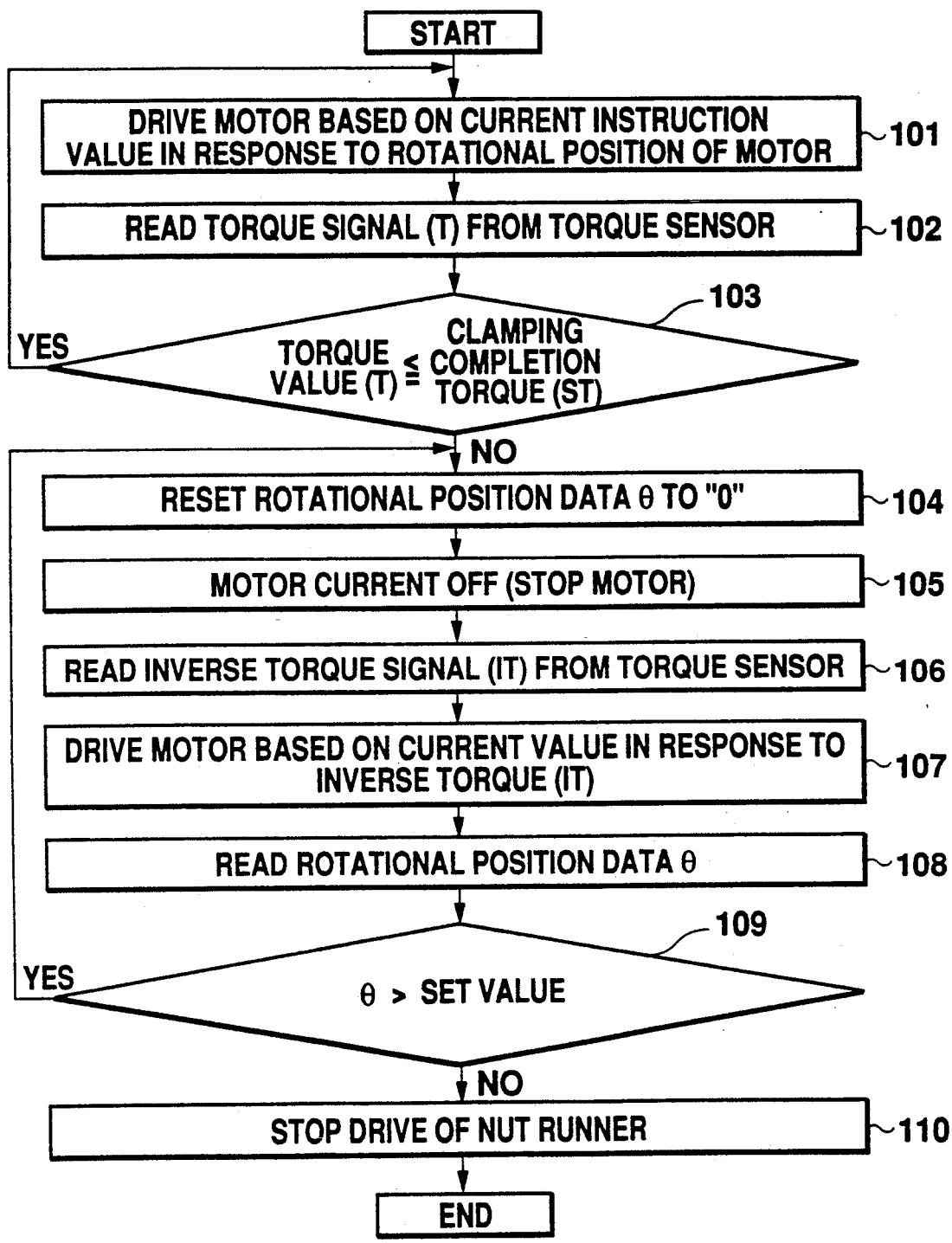
FIG. 4 is a flowchart illustrating a procedure for the clamping operation of the nut runner according to the first embodiment of the present invention.

FIG. 4 is a flowchart showing a procedure for a clamping operation of the nut runner according to the first embodiment of the present invention. This flowchart is executed based on a program stored within the control section 14 of the control unit 50. When a clamping start signal is produced from the external device of the control unit 50, the motor 4 is driven based on a current instruction value in response to a rotational position of the motor 4, i.e. a rotational position of the clamping portion 10 of the clamping unit 1 (Step 101). A clamping torque signal T transmitted from the distortion gauge type torque sensor 8 is read at Step 102, the clamping torque signal T (hereinafter referred to as simply a clamping torque T) is compared with a clamping completion torque ST at Step 103. If the clamping torque T is less than the clamping completion torque, the procedure returns to Step 101. Subsequently, the processes at Steps 101 to 103 are repeated until the clamping torque T becomes not less than the clamping completion torque ST. That is, the process at Step 103 corresponds to a torque comparison means.

Figure 2:
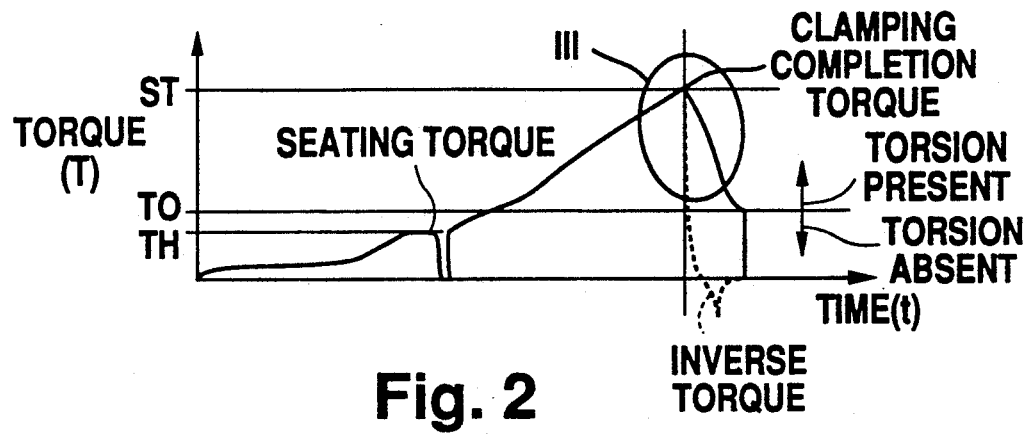
FIG. 2 is a graph representing a characteristic (clamping torque T—time t) of the nut runner according to the present invention.

This causes a workpiece such as the bolt to be gradually clamped with a clamping torque T based on a characteristic (clamping torque T—Time t) shown in FIG. 2. It is to be appreciated that the clamping torque T becomes temporarily 0 after reaching the seating torque TH. This is due to a fact that when a plurality of bolts are clamped for one instrument the motor 4 is temporarily stopped for the synchronization of clamping and then restarted simultaneously.

When the clamping torque T is beyond the clamping completion torque ST, the rotational angle signal (rotational position data $\theta$) of the motor 4 is reset at Step 104, and the motor 4 is brought to a stop at Step 105. In this case, the reduction gear head 6 and the like of the clamping unit 1 undergo an accumulation of a resilience such as a torsion arising from the clamping. As a result, when the motor 4 comes to a rest and a rotor of the motor 4 becomes free for rotation, the rotor is forced to rotate in the opposite direction to the clamping direction for the bolts and the like due to the resilience accumulated in the unit 1. This brings about an inverse torque IT or a counter torque on the motor 4.

At step 106, the inverse torque IT is determined and read based on a distortion of the rotational shaft of the reduction gear head 6 detected by the distortion gauge type torque sensor 8. Furthermore, at step 107 the motor 4 is driven based on a current value AI in response to the inverse torque IT, thereby generating a forward torque (post-clamping force) equal to or counteracting the inverse torque IT to cancel the inverse torque IT and to stop the rotation of the rotor of the motor 4.

At step 108, a rotational position data is read under a condition where the rotation of the rotor of the motor 4 for the main clamping comes to completion. More specifically, an angle representing how far the rotor of the motor 4 is backwardly rotated in the reverse direction during the time between the deenergization of the motor at Step 105 and an initiation of the energization of the motor 4 at Step 107 is read. The rotational position data is then compared with the set value at Step 109. It is to be noted that the set value is usually 0-degree or minimum degree. Therefore, the rotational position data larger than the set value represents an existence of the reverse rotation of the rotor of the motor 4. It is seen that the resilience is accumulated in the clamping unit 1. In this case, the procedure returns to Step 104 for the reset of the rotational position data followed by Step 105 for the stop of the motor 4.

Figure 3:
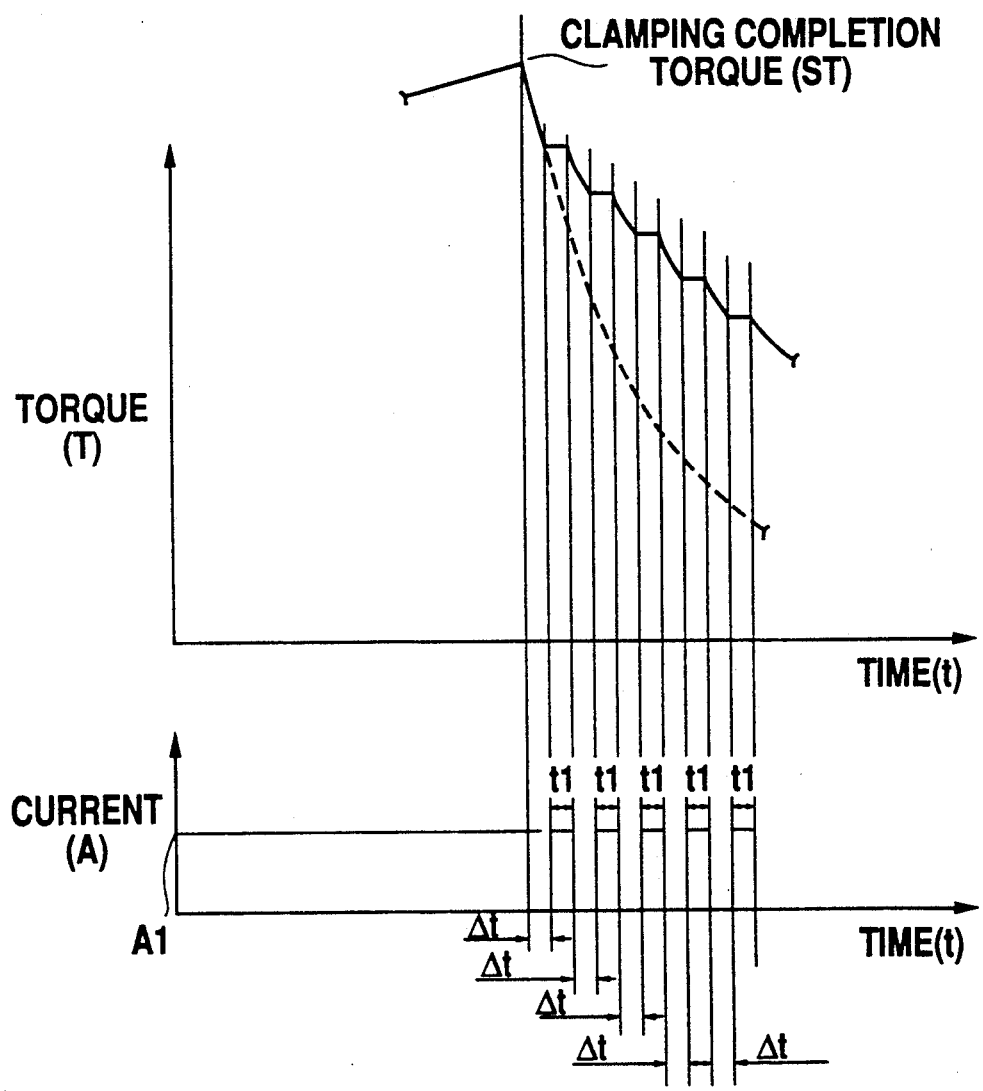
FIG. 3 is a graph representing a torque control means of the nut runner in accordance with a first embodiment of the present invention.

It is to be noted that the duration from the stop of the motor 4 at Step 105 to the activation of the motor 4 at Step 107 is set for $\Delta t$, while the duration from the activation of the motor 4 at Step 107 to the stop of the motor 4 at Step 105 is set for t1 as shown in FIG. 3. More specifically, as is seen from FIG. 3 the post-clamping torque T is sharply decreased for the duration (time $\Delta t$) between the stop and activation of the motor 4. During the operation of the motor 4, however, the inverse torque IT is canceled by the forward torque and the rotor of the motor 4 is stopped, thereby keeping the post-clamping torque at a fixed value.

The repetition of such processing results in a gradual decrease of the post-clamping torque T as shown by the solid line in FIG. 3. When the rotor is prevented from reverse rotation irrespective of the stop of the motor and finally the rotational position data becomes equal to the set value ($\theta = 0$) it is judged that the reduction gear head 6 and the like of clamping unit 1 is now free from the accumulation of resilience. Then the procedure advances to Step 110 where the drive of the nut runner is stopped to terminate the clamping work of the bolts and the like. That is, the processes from Step 104 to Step 109 correspond to a torque control means for the prevention of looseness.

In the embodiment hereinbefore described, the rotational torque of the motor 4 for post-clamping is gradually decreased until the resilience such as distortion accumulated in the clamping unit 1 is entirely nullified, thereby ensuring an effective cancellation of the reverse torque of the motor 4 to prevent the bolts and the like from being affected by the reverse torque, to consequently prevent looseness of the bolts and the like.

Figure 5:
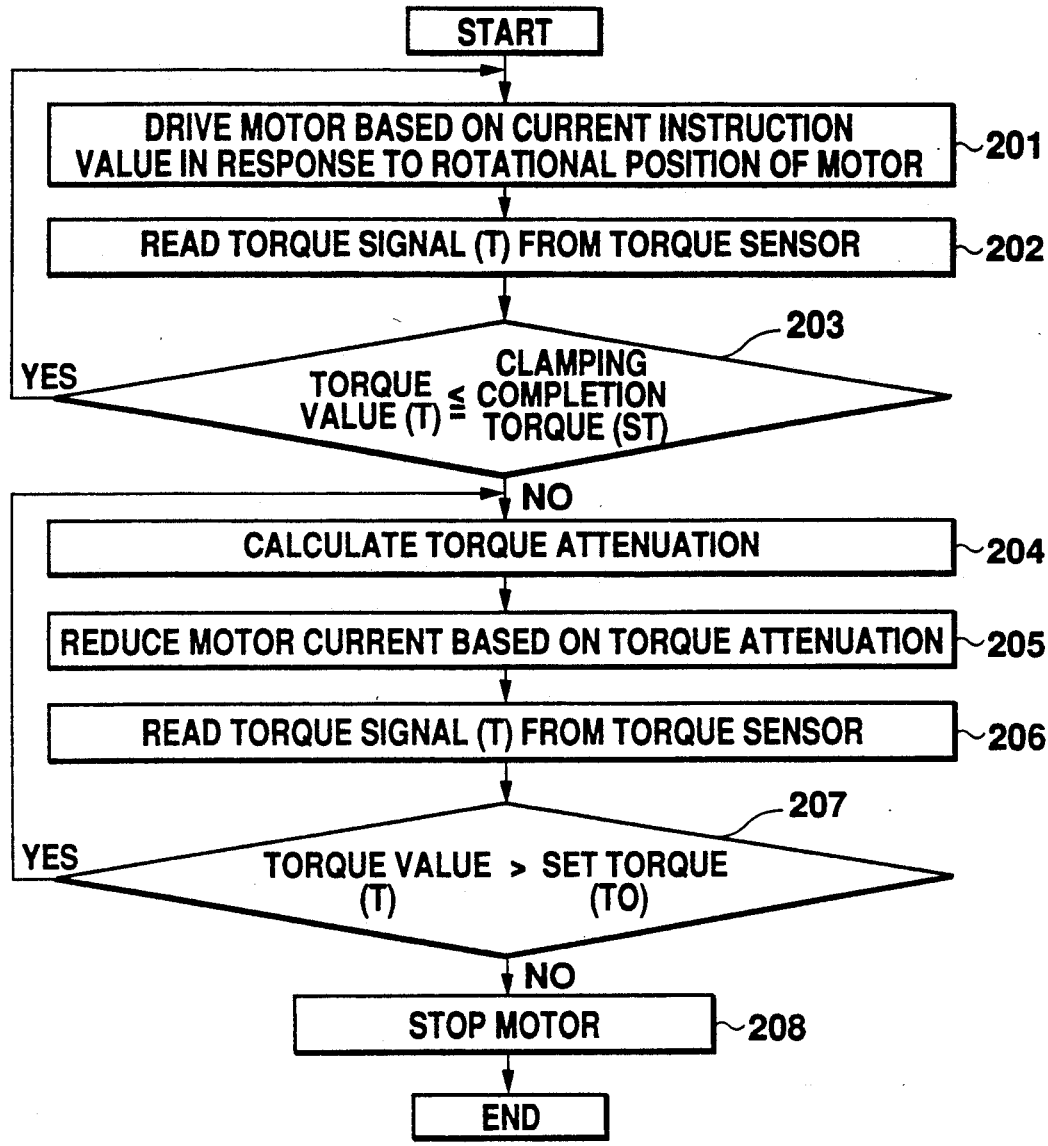
FIG. 5 is a flowchart showing a procedure for the clamping operation of the nut runner according to a second embodiment of the present invention.

FIG. 5 is a flowchart showing a procedure of a clamping action of the nut runner according to a second embodiment of the present invention.

The nut runner of this embodiment is substantially the same as that of the first embodiment in system configuration except for a slight difference in its clamping procedure. The procedure for the clamping procedure of the nut runner according to this embodiment will be described with reference to the flowchart in FIG. 5.

When a clamping start signal is first output from the external device of the control unit 50, the motor 4 is driven based on a current value in response to a rotational position of the motor 4, that is, a rotational position of the clamping portion 10 of the clamping unit 1 (Step 201). A clamping torque signal T transmitted from the distortion gauge type torque sensor 8 is read at Step 202, and then the clamping torque signal T (referred to hereinafter as simply a clamping torque T) is compared with the clamping completion torque ST at Step 203. If the clamping torque T is less than the clamping completion torque ST, the procedure returns to Step 201. Subsequently, the processes at Steps 201 to 203 are repeatedly executed. The processes hitherto are the same as the main clamping procedure for the nut runner according to the first embodiment.

Afterwards, if the clamping torque becomes not less than the clamping completion torque ST, the procedure advances to Step 204 where a torque attenuation for the post-clamping is calculated based on a predetermined torque attenuation function. At Step 205, the current to motor 4 for a post-clamping is decreased based on the torque attenuation to gradually decrease the rotational torque of the motor 4. Furthermore, the clamping torque T from the distortion gauge type torque sensor 8 is read at Step 206, and the clamping torque T is compared with the set torque TO at Step 207. The set torque TO means a maximum free clamping torque T under the condition where the clamping unit is free from the accumulation of the resilience such as torsion.

When it is judged that the clamping torque is not less than the set torque TO at Step 207, the procedure returns to Step 204 for the execution of the processing described above.

When the processes from Step 204 to step 207 are thus repeatedly executed, and the clamping torque T becomes equal to the set torque TO, the procedure is allowed to advance to Step 208 for stopping the motor 4.

In this embodiment as described above, the rotational torque of the motor 4 is gradually decreased until the resilience such as torsion accumulated in the clamping unit 1 is entirely nullified after the clamping of the bolts and the like in the same manner as the first embodiment. As a result, the inverse torque IT of the motor 4 is effectively canceled and the bolts and the like are not affected by the inverse torque.

According to the present invention, the inverse torque of the motor arising from the resilience such as torsion accumulated in the clamping unit is not allowed to affect the workpiece such as bolts and the like. This prevents the workpieces such as bolts from being subjected to a looseness, which eliminates the need for further additional clamping in later processes.

What is claimed is:

1. A nut runner device having a motor with controllable rotational torque and a clamping unit driven by the motor for clamping a workpiece with a predetermined completion clamping torque, comprising:

torque detector means for detecting a clamping torque and an inverse torque of said clamping unit;

torque control means, including a torque comparison means for comparing said detected clamping torque with a torque value corresponding to the predetermined completion clamping torque, said torque control means further including means responsive to the detected clamping torque reaching the predetermined completion clamping torque as determined by the torque comparison means for gradually reducing the rotational torque of said motor, the torque control means including means for applying to said clamping unit a post-clamping torque substantially equal to a torsional force accumulated in said clamping unit for the clamping of the workpiece.

2. A nut runner according to claim 1, wherein the torque detector means comprises a distortion gauge type torque sensor for sensing the torque of the clamping unit.

3. A nut runner according to claim 1, further comprising:

a position detecting means for detecting a main completed clamping position of the clamping unit for the main clamping; and the torque control means includes means for driving the clamping unit to the detected completion position with gradually reducing post-clamping torque.

4. A method of clamping a bolt with a predetermined torque comprising the steps of:

executing a main clamping step including driving a clamping unit until a main clamping torque reaches a predetermined main clamping completion torque;

executing a detecting step including detecting an inverse torque generated in the clamping unit on the basis of an accumulated resilience;

executing a post-clamping step for driving the clamping unit with a post-clamping torque substantially equal to the detected inverse torque, the post-clamping torque being gradually reduced to nullify the inverse torque.

5. The method of claim 4, wherein the post-clamping step comprises the substeps of:

(a) detecting a rotational main clamping position of the clamping unit when the main clamping step is completed;

(b) detecting the inverse torque generated in the clamping unit at times when the clamping unit is free for rotation;

(c) driving a clamping motor with a post-clamping torque corresponding to the detected inverse torque until a rotational position of the clamping unit reaches the main clamping position; and (d) repeating the substeps (a), (b), (c) until an inverse rotation of the clamping unit reaches a predetermined minimum torque value.

6. The method of claim 4 wherein the step of driving the clamping motor with a post-clamping torque is maintained for a predetermined duration of time.

7. The method of claim 5 wherein the substep of detecting the inverse torque comprises the sub substeps of:
resetting the rotational position data of the unit;
interrupting electrical current flow to the clamping motor; and
reading an inverse torque signal from a torque sensor.

8. The method of claim 5 wherein the substep of driving the clamping motor with the post-clamping torque comprises the sub substeps of:
driving the clamping motor based on current value in accordance with the inverse torque;
reading the rotational position data of the motor;
comparing the rotational position data of the motor with a set value; and
stopping the driving of the nut runner in response to the position data reaching the set value.

9. A method of clamping a bolt with a predetermined torque comprising the steps of:
executing a main clamping step including driving a clamping unit until a main clamping torque reaches a predetermined main clamping completion torque;
executing a post-clamping step for driving the clamping unit with a post-clamping torque substantially equal to an inverse torque generated in the clamping unit, the post clamping torque being gradually reduced to nullify the inverse torque;
wherein the post-clamping step includes the substeps of,
(a) calculating a torque attenuation based on a predetermined torque attenuation function;
(b) driving a clamping motor based on the torque attenuation function to gradually decrease the rotational torque thereof;
(c) detecting a clamping torque of the clamping unit;
(d) comparing the clamping torque with a predetermined maximum free clamping torque indicating a condition where the clamping unit is free from an accumulation of a torsion resilience; and
repeating the substeps (a), (b), (c) and (d) until a clamping torque reaches the predetermined maximum free clamping torque.

10. The method of claim 9 wherein: the substep of driving the clamping motor includes reducing the motor current based on torque attenuation; and wherein the substep of detecting a clamping torque includes the sub substep of reading a torque signal after each reduction of the motor current.

* * * * *